(12) United States Patent
Breitfeld et al.

(10) Patent No.: US 7,440,879 B2
(45) Date of Patent: Oct. 21, 2008

(54) FINITE ELEMENT SIMULATION

(75) Inventors: Thorsten Breitfeld, Boeblingen (DE); Frank Buschbeck, Sindelfingen (DE)

(73) Assignee: Daimler AG, Stuttgart (DE)

(*) Notice: Subject to any disclaimer, the term of this patent is extended or adjusted under 35 U.S.C. 154(b) by 419 days.

(21) Appl. No.: 10/986,340

(22) Filed: Nov. 11, 2004

(65) Prior Publication Data
US 2005/0171745 A1    Aug. 4, 2005

(30) Foreign Application Priority Data
Nov. 12, 2003  (DE) ................ 103 52 720

(51) Int. Cl.
G06G 7/48  (2006.01)
(52) U.S. Cl. ............................... 703/6; 703/2
(58) Field of Classification Search ............. 703/6–8, 703/1, 2
See application file for complete search history.

(56) References Cited

U.S. PATENT DOCUMENTS

| 5,736,645 | A | 4/1998 | Chin-Chan et al. ............ 73/799 |
| 6,212,486 | B1 * | 4/2001 | Huang et al. .................... 703/7 |
| 2003/0114995 | A1 | 6/2003 | Su et al. ......................... 702/34 |

FOREIGN PATENT DOCUMENTS

DE    199 27 941    12/2000

OTHER PUBLICATIONS

Myer Kutz, "Mechanical Engineers' Handbook" 1998, John Wiley & Sons, 2nd Edition, pp. 414-417.*

Dubbel—Taschenbuch fuer den Maschinenbau, (Dubbel's Handbook of Mechanical Engineering) 20th edition, Springer 2001, pp. C48-C50.
About Mystran, available at http://www.mystran.com/About_MYSTRAN.htm; printed Aug. 12, 2003, 3 pages.
Description of Medina, available at http://www.c3pdm.com/des/products/medina/documentation/medina-DINA4_e.pdf, printed Feb. 5, 2003, 8 pages.
H. Sandstroem, M. Shamlo, Development of Adrian—Joint Analysis Software, M.Sc. Thesis, Chalmers University of Technology, Sweden 2002, available at: http://www.phi.chalmers.se/pub/msc/pdf/phimsc-sandstrom-shamlo-02.pdf, printed Jul. 21, 2003 (double-sided), 74 pages.

(Continued)

Primary Examiner—Paul L Rodriguez
Assistant Examiner—Luke Osborne
(74) Attorney, Agent, or Firm—Davidson, Davidson & Kappel, LLC

(57) ABSTRACT

A method for automatic evaluation of a finite element simulation for an industrial system such as a motor vehicle body includes predefining an electronic design model of the industrial system and generating finite elements for the model. The stresses occurring in the finite elements are determined using a finite element simulation. Each finite element, which is a two-dimensional element and not a rigid object element and whose stress exceeds a predefined stress limiting value, is determined. For each determined two-dimensional element which is not a triangle, an element limiting value is determined on the basis of the stress limiting value. Each determined two-dimensional element is classified as critical if its computed stress exceeds the established element limiting value. The method enables identification of areas of the industrial system having a high stress and reduces the effect of inaccuracies that occur on the evaluation of the finite element simulation due to the approximation of the vehicle body by finite elements.

12 Claims, 12 Drawing Sheets

OTHER PUBLICATIONS

Description of ABAQUS/Standard Version 6.3, available at http://www.hks.om/reference/epaper/ABAQUS_Standard63.pdf, printed Aug. 14, 2003 (double-sided), 30 pages.

Description of PAMCRASH for Finite-Elements Simulation of Collisions, available at http://www.esi-group.com/NumericalSimulation/index_html#a1, printed Aug. 14, 2003.

E. Haug, J. Clinckemaillie, et al., Recent Trends and Advances in Crash Simulation and Design of Vehicles, available at: http://www.esi-group.com/Finite_elements_analysis/Finite_elements_analysis/Publications/recent_trends.zip, printed Aug. 14, 2003, 22 pages.

Miner's Rule: An Engineer's Toolbox Calculation Module, available at http://www.engineerstoolbox.com/doc/etb/mod/fm1/miner_help.html, 2 pages.

Dubbel—Taschenbuch fuer den Maschinenbau, (Dubbel's Handbook of Mechanical Engineering) 20th edition, Springer 2001, p. E11, 1 page.

G. Riley, J. Giarratano, Expert Systems: Principles and Programming, PWS-Kent Publ. Co., (1989), Table of Contents, 10 pages.

T.R. Chandrupalta, A.D. Belegundu, Introduction to Finite Element in Engineering, Prentice Hall 1991, 214 pages.

T.R. Chandrupalta, A.D. Belegundu, Introduction to Finite Element in Engineering, Second Edition, Prentice Hall 1991, 1997, Table of Contents, 7 pages.

T. Breitfeld, Entwicklung von Expertensystemen zur Unterstuetzung konstruktionsbegleitender Finite-Elemente-Berechnungen, published in B. Kroeplin (publ.): Bericht 29-99, Institut fuer Statik und Dynamik der Luft- und Raumfahrtkonstrucktionen, Universitaet Stuttgart (1999), 36 pages.

B. Klein, FEM-Grundlagen und Anwendungen der Finite-Elemente-Methode, 3rd edition, 1999, 180 pages.

Description of MSC.NASTRAN, described at http://www.mscsoftware.com/assets/337_PA_LT-DAT-V2001.pdf, last accessed Aug. 14, 2003, 9 pages.

MSC.Patran 2001 Update Information, MSC.Software Corporation, available at www.mscsoftware.com, last accessed Feb. 5, 2003, 8 pages.

PAM-Crash Overview, ESI Group, available at www.esi-group.com/NumericalSimulation/index_html, last accessed Aug. 14, 2003, 3 pages.

F. Puppe, J. Meyer-Fijara, Expertensysteme und Wissenmodellierung, in G. Goerz (publ.): Einfuehrung in die kuenstliche Intelligenz, Addison-Wesley Publ., 2$^{nd}$ edition (1995), Chapter 7, pp. 705-753.

* cited by examiner

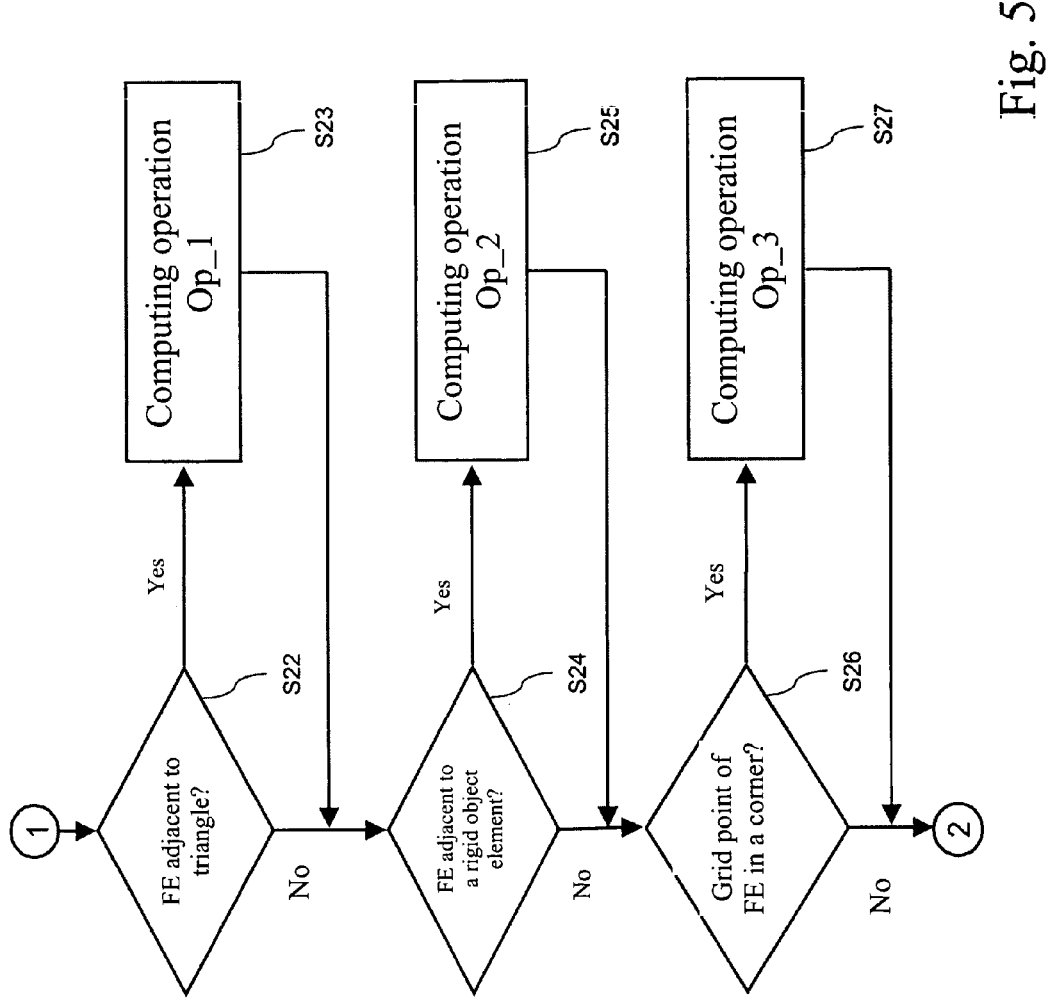
Fig. 5 (1st Continuation)

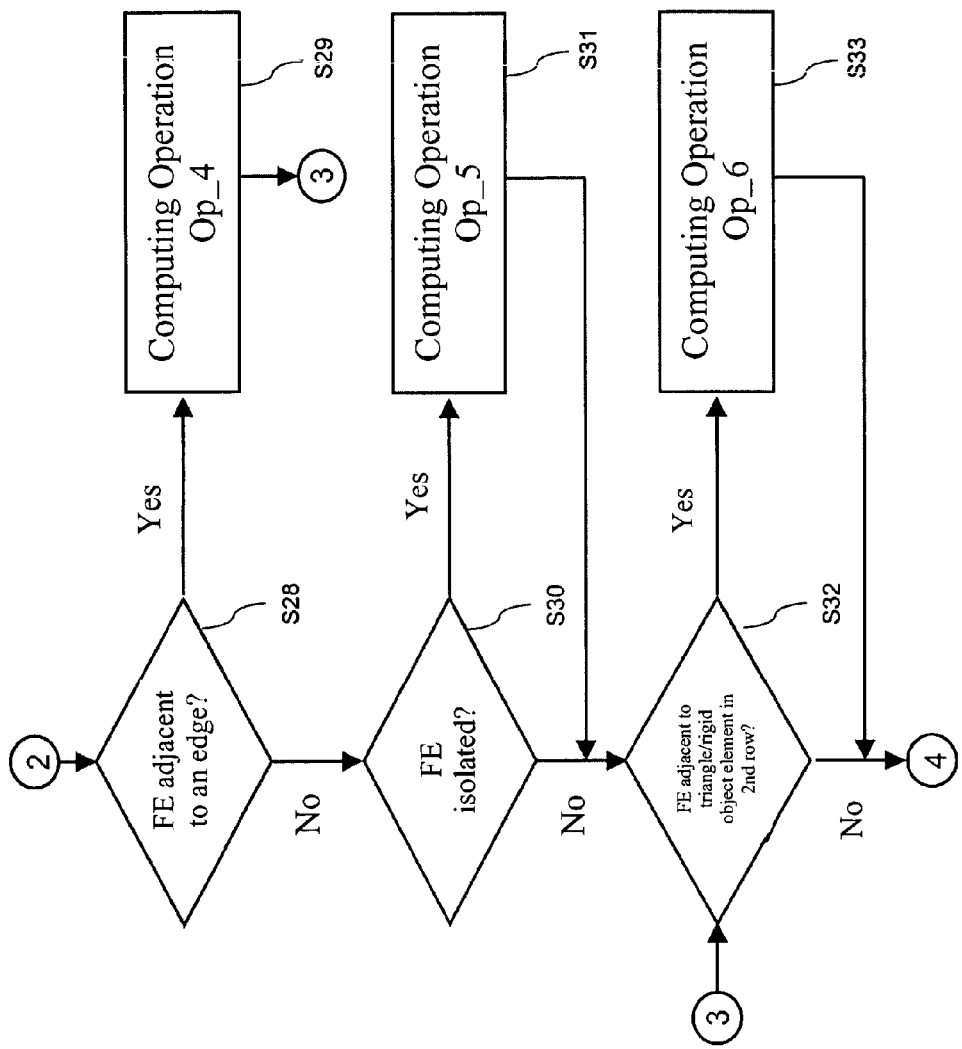
Fig. 5 (2nd Continuation)

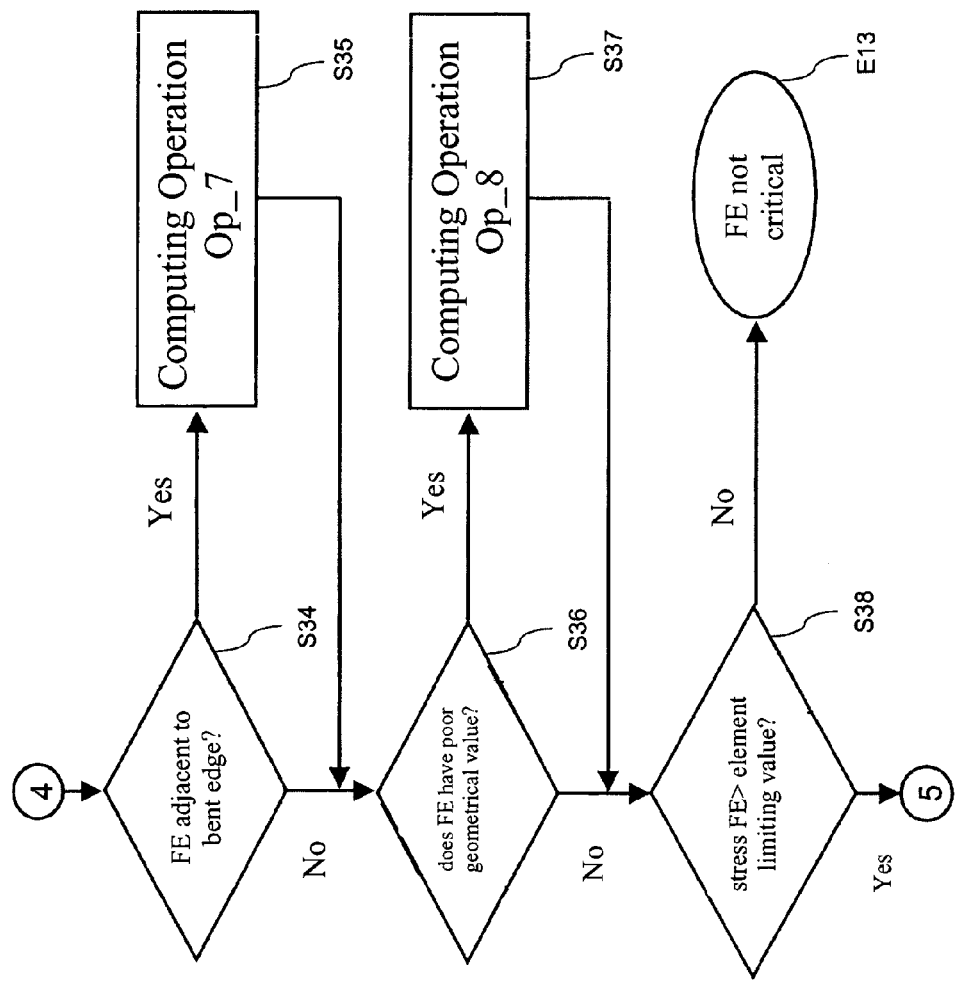
Fig. 5 (3rd continuation)

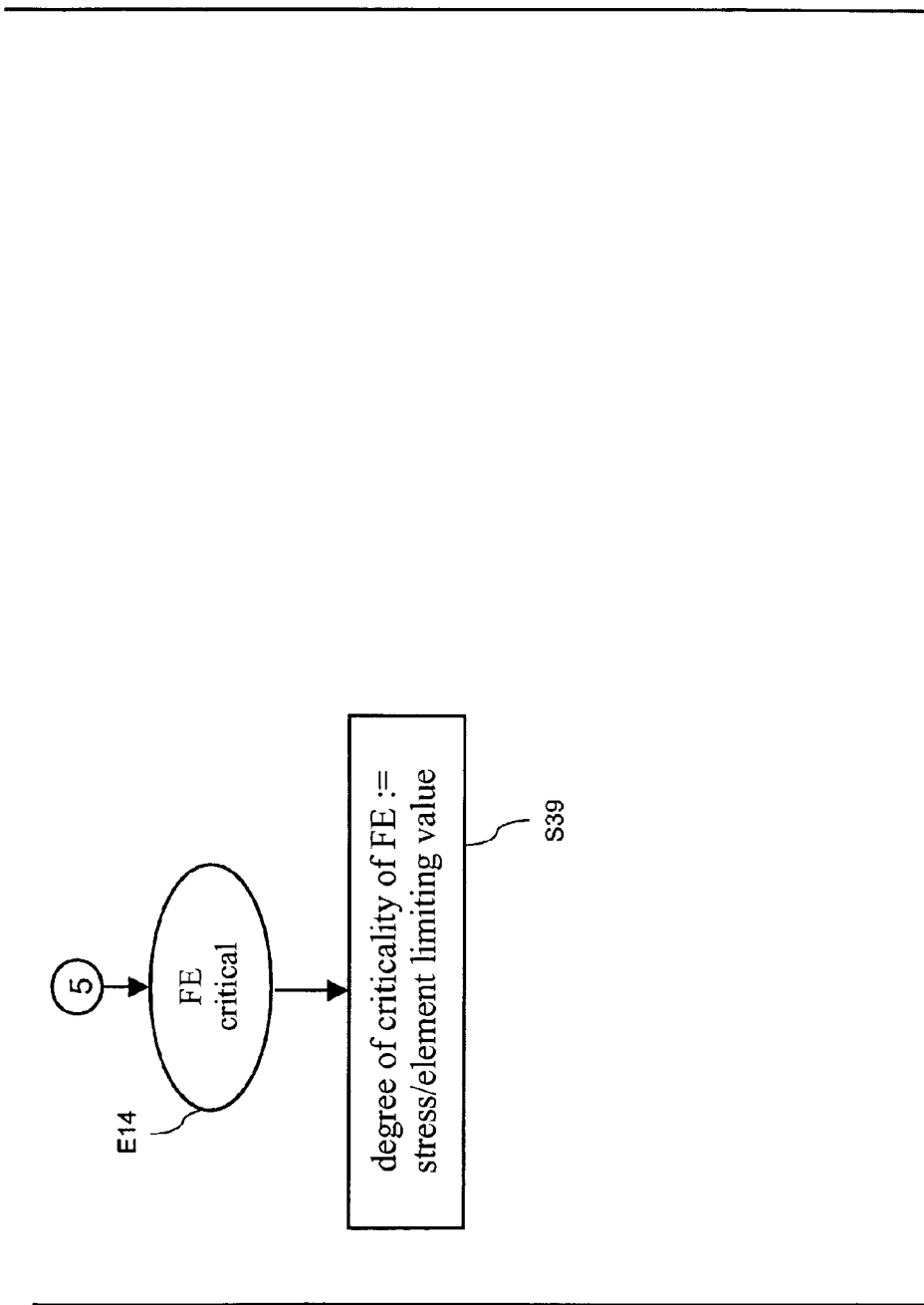
Fig. 5 (4th Continuation)

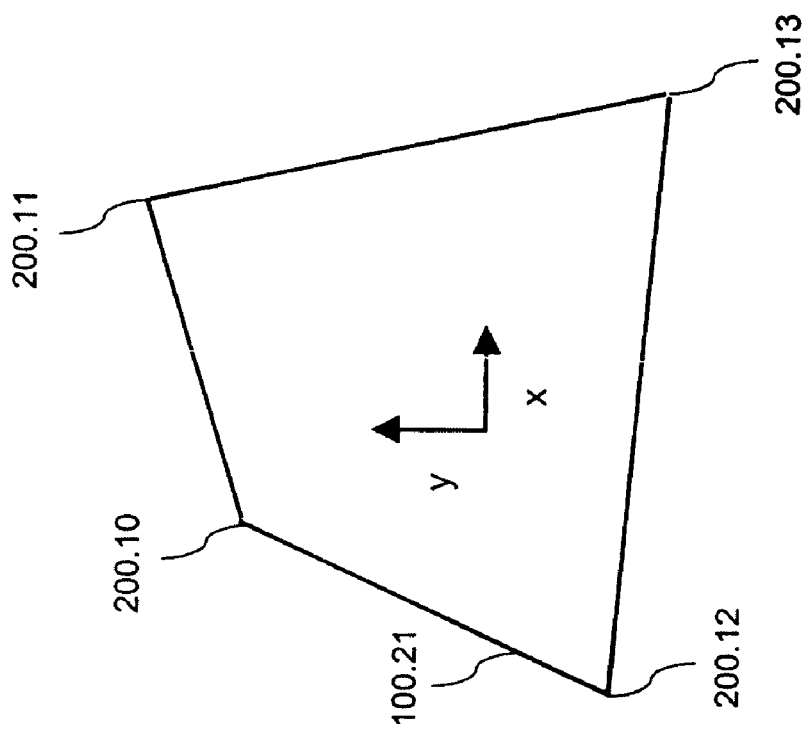
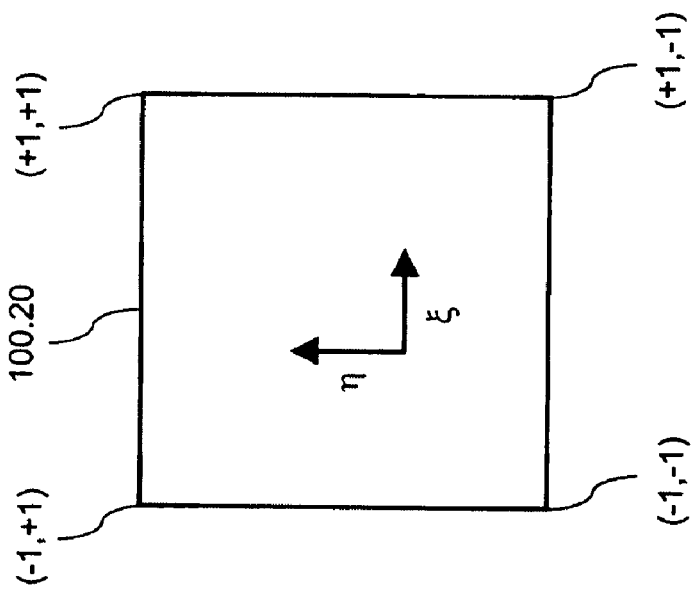
Fig. 10

FINITE ELEMENT SIMULATION

Priority is claimed to German Patent Application No. DE 103 52 720.6, filed on Nov. 12, 2003, the entire disclosure of which is incorporated by reference herein.

The present invention relates to a finite element simulation for an industrial system, for examples for an automobile body.

BACKGROUND

The finite element method is known from the "Dubbel - Taschenbuch für den Maschinenbau" [Dubbel's Handbook of Mechanical Engineering], 20$^{th}$ Ed., Springer Verlag, 2001, C48 through C50, from B. Klein: "FEM - Grundlagen und Anwendungen der Finite-Elemente-Methode" [FEM - Basic Principles and Applications of the Finite Element Method] Vieweg Verlag, 3$^{rd}$ Ed., 1999, from T. R. Chandrupalta and A. D. Belegundu: "Introduction to Finite Element in Engineering," Prentice-Hall, 1991, and from DE 19927941 C1. Strength problems of all kinds, e.g., for stress distribution or stability, are solved numerically using a finite element simulation. For example, it is determined how a system made up of deformable objects is deformed and warped under external loads, and what stresses occur in the objects in these cases. The system may be the body of a motor vehicle, for example, and the objects may be components of the body. An electronic design model, available on computer, of a system to be studied is provided. The model preferably has the form of a three-dimensional CAD model.

In this model, a certain set of points, referred to as grid points, is established. Those surface or volume elements whose geometries are defined by the grid points are referred to as finite elements. The grid points form a mesh in the model; therefore, the procedure of establishing grid points and generating finite elements is referred to as meshing the model. The result of the procedure is known as a finite element mesh.

Curved surfaces or objects which are approximately considered as surfaces, e.g., the sheet metal of a motor vehicle body, are often split up into two-dimensional elements, also known as shell elements. The two-dimensional elements normally used are located in a single plane and have no curvatures. Roundings are approximated by a 90° edge, a 45° bevel or, less frequently, by a plurality of flat elements.

The most important types of two-dimensional elements are triangles having three grid points and quadrangles having four grid points. These three or four grid points also form the corners of the two-dimensional elements. In addition, quadrangles having eight or nine grid grid points are located at the midpoints of the quadrangle sides. One special type of finite element is the rigid object element, which connects grid points of different two-dimensional elements rigidly and with zero degrees of freedom. For example, a point at which a force acts upon a component (e.g., a threaded connection) is modeled by a rigid object element. No stress computation is performed for a rigid object element because this is impossible due to its stiffness. Different types of finite elements are available in "About MYSTRAN" at http://www.mystran.com/About_MYSTRAN.htm, consulted on Aug. 12, 2003.

Depending on the problem at hand, displacements of these grid points and/or rotations of the finite elements at these grid points and/or the stresses at certain points of these finite elements, namely in the points of integration, are introduced as unknowns. Equations are set up, which approximately describe displacements, rotations and/or stresses within a finite element.

Additional equations result from the relationships between different finite elements, e.g., from the fact that the principle of virtual work must be satisfied at the grid points and the calculated displacements must be continuous, and the boundary condition that no gaps or penetrations occur must be satisfied.

In many cases such equations are linear with respect to the unknowns. The finite element method may also be used, however, in the case of non-linear equations, for example, for equations in the form of polynomials. Non-linear equations occur, for example, in contact computations or heat radiation analyses. In general, a system of equations, which is often very extensive, is set up and solved numerically with the grid point displacements, grid point rotations, stresses in the points of integration or other quantities as unknowns. The solution of the equations describes, for example, the state of deformation of the system under given loads. Stress distributions, vibration responses, buckling responses, or service life predictions, for example, may be derived from this solution. For example, if the displacements of all grid points and stresses in the points of integration of a finite element are determined, the stress in the element may be derived from the material models.

For example, in the design of a motor vehicle body it should be predicted, using finite element simulation, what stresses occur in which areas of the body. Often different load scenarios are predefined and at least one simulation is carried out for each load scenario. During the simulation, the stresses in the points of integration of the finite elements are computed. From the stresses in its points of integration, the stress of a finite element is computed, for example, as the average of the stresses in the points of integration.

In a subsequent evaluation, those finite elements whose stresses exceed a predefined stress limiting value in the simulation are determined automatically. The positions of finite elements for which high stresses have been found in the finite element simulation indicate areas of the model in which the industrial system is at risk of undesirable deformations or damage, e.g., cracks, due to high stress.

The software tool MEDINA has functionalities for carrying out the meshing of a given model, i.e., for generating finite elements for the model. A description of MEDINA is found at http://www.c3pdm.com/des/products/medina/documentation/medina-D A4_e.pdf, consulted on Feb. 5, 2003. Using meshing, the type of finite element is determined for each finite element, i.e., for example, whether it is a triangle, a quadrangle, a rigid object element, or some other finite element. Furthermore, the spatial position of the finite element is determined. MEDINA provides a finite element mesh as the result of the meshing. A finite element tool inputs the generated finite element mesh and performs a finite element simulation, in which the stresses occurring in the finite elements are computed.

A finite element of the model is determined when it is a two-dimensional element and its stress exceeds a predefined stress limiting value. MEDINA then displays the result of the finite element simulation graphically; among other things, the determined finite elements are displayed in red in one representation of the model.

In H. Sandström and M. Shamlo: "Development of ADRIAN - Joint Analysis Software," M.Sc. Thesis, Chalmers University of Technology, 2002, available at http://www.ph-i.chalmers.se/pub/msc/pdf/phimsc-sandstrom-shamlo-02.pdf, consulted on Jul. 21, 2003, a software program named ADRIAN is described. This program analyzes a finite element mesh of a motor vehicle body, in particular the palrtial models for w elded and other joints. ADRIAN analyzes, as MEDINA, the quality of the meshing and compares, for example, the aspect ratio, the taper, and the skew with threshold values.

A finite element having a stress that is greater than the stress limiting value may indicate an area of the industrial system described by the model which does not withstand the given load, and therefore may be a critical finite element. However, exceeding the predefined stress limiting value may also simply result from the fact that meshing of a model is inevitably an approximate model of the actual industrial system, for example, because the finite elements only approximately represent curvatures. Therefore, the finite element simulation only approximately reproduces reality, so that it is possible for an excess stress to occur just in the simulation, but not in reality.

U.S. Pat. No. 6,212,486 B1 describes a method for classifying finite elements having high stresses as critical. A finite element simulation is performed. A modal stress is determined for a finite element; the maximum possible ordinary stress and the shear stress are derived therefrom, and a maximum possible van Mises stress is computed. If this is greater than an upper limit, the finite element is critical. A fatigue analysis is performed using the variation of the stress of a finite element over time.

When using the methods known from the related art, it is left to the experience of an observer to evaluate the results of a finite element simulation, in particular the stresses in the finite elements. The related art provides no method that makes it possible to distinguish actual excess stresses from excess stresses resulting merely from the approximation of the model by finite elements.

SUMMARY OF THE INVENTION

An object of the present invention is to provide a finite element simulation for improving the critical classification of finite elements.

The present invention provides a finite element simulation for an industrial system using a data processing system,
  a computer-evaluatable design model of the system and finite elements for the model being available;
  the stresses occurring in the finite elements being computed using the finite element simulation, and
  each finite element, which is a two-dimensional element and whose stress exceeds a predefined stress limiting value, being determined wherein for each determined two-dimensional element (FE) having at least four grid points, an element limiting value is determined by performing the following steps:
  the predefined stress limiting value is used as a starting value for the element limiting value;
  a check is performed to see whether a side or a grid point of the determined two-dimensional element (FE) is adjacent to a triangle or a rigid object element and, if this is the case, the element limiting value is increased;
  a check is performed to see whether a grid point of the determined two-dimensional element (FE) is located in a rounded corner (30) of the model and, if this is the case, the element limiting value is increased, and
  a check is performed to see whether no side of the determined two-dimensional element (FE) is located on an edge (40.1, 40.2) of the model delimiting the model and no side of the determined two-dimensional element (FE) is adjacent to a side of another determined two-dimensional element and, if this is the case, the element limiting value is increased, and a determined two-dimensional element (FE) is classified as critical if its computed stress is greater than its determined element limiting value.

The method according to the present invention determines two-dimensional elements having a stress that is greater than the predefined stress limiting value. An element limiting value is determined for each determined two-dimensional element. If the computed stress of a determined two-dimensional element exceeds its determined element limiting value, the two-dimensional element is classified as critical; otherwise it is not. The determined two-dimensional elements not classified as critical belong to those finite elements which have a high stress only because of the inaccuracy due to the approximation by finite elements.

The critical two-dimensional elements are identified among the determined elements using the method according to the present invention and the other determined two-dimensional elements are thus filtered out. This reduces the influence of inaccuracies resulting from the approximation by finite elements on the determination of critical finite elements. One distortion of the stress resulting from the inaccuracy is compensated for by determining an individual element limiting value for each finite element having at least four grid points. The method causes the element limiting value to be increased in three situations that result in substantial inaccuracies. The three criteria which are checked when performing the three last steps are met in situations which often occur when approximating the model by finite elements and which distort the results of the finite element simulation in a particularly pronounced manner.

The finite elements classified by the method as critical form those areas of the industrial system described by the model in which excessively high stresses will occur. If the industrial system is manufactured according to this model, there is a risk of material fatigue and/or cracks developing in those areas in actual operation.

The element limiting value of each determined two-dimensional element is determined by using four steps. The first step is the use of the predefined stress limiting value for the element limiting value as the starting value. The three other steps each include a computer-analyzable criterion. When carrying out each step, it is checked whether the criterion is met. If this is the case, the element limiting value is increased. Otherwise it remains unchanged. It is possible that a plurality of criteria are met for a determined two-dimensional element and therefore its element limiting value is increased multiple times. It is also possible that none of the criteria is met for a determined two-dimensional element. In this case the element limiting value of this two-dimensional element remains equal to the starting value, i.e., equal to the predefined stress limiting value.

Each of the criteria of the last three steps characterizes a situation in which the stress computed on the basis of the finite element simulation differs from the actual stress. The steps compensate for the influences of such situations by adjusting the threshold value.

In particular, the following steps are performed and the following criteria are checked:
  It is checked whether the determined two-dimensional element is a triangle. A triangle is basically not classified as critical. This is because a simulation using the finite element method inevitably only approximately maps reality. A triangle is very rigid and therefore in the simulation it produces stresses which are excessive compared to reality.
  For each determined two-dimensional element which has at least four grid points and therefore is not a triangle, the predefined stress limiting value is used as the starting value in determining the element limiting value. This starting value is established as a function of the material used and its properties or, if test results are available, from those for the model or model class to which the two-dimensional element belongs. The element limiting value has the same dimension as the stress limiting value and as the computed stresses, MPa, for example.

The element limiting value is increased if one side or one grid point of the determined two-dimensional element is adjacent to a triangle or a rigid object element. The excessive stress which is computed for the excessively rigid triangle and the theoretically infinite stiffness of the rigid object element also affects adjacent two-dimensional elements in that an excessive stress is computed for the adjacent two-dimensional elements in the finite element simulation. This influencing factor is compensated for by increasing the element limiting value.

The element limiting value is increased if a grid point of the determined two-dimensional element is located in a rounded corner of the model. The rounding is then not simulated at all by the finite elements or is simulated inaccurately. Instead, the meshing will model non-continuous transitions or corners which in turn result in artificially increased stiffness or excessive theoretical stress concentration factors and thus increased stresses. In the simulation, a rounded corner or a free punch therefore results in excessive stresses in the points of integration of the two-dimensional element located near the corner or the free punch. In practice, an excessive stress is attributed to the two-dimensional element. This influencing factor is compensated for by increasing the element limiting value.

The element limiting value is also increased if no side of the determined two-dimensional element is located on an edge of the model delimiting the model and no side is adjacent to a side of another determined two-dimensional element.

This criterion distinguishes determined two-dimensional elements located inside the model from others located on the edge. If a two-dimensional element located on an edge has a greater stress than the stress limiting value, this may more easily result in a crack starting at the edge than a high stress inside the system described by the model. The criterion also distinguishes individual isolated determined two-dimensional elements from multiple contiguous determined two-dimensional elements. An isolated determined two-dimensional element is understood as a two-dimensional element whose stress exceeds the stress limiting value and which is exclusively adjacent to two-dimensional elements whose stresses are less than or equal to that of the stress limiting value. Multiple contiguous determined two-dimensional elements indicate an excessive load on the industrial system in this area.

It is possible that, after the completion of the method, all determined two-dimensional elements have different element limiting values or all have the same element limiting value or that only three different values, for example, are established for the element limiting values overall.

The element limiting value of a determined two-dimensional element is established independently of the element limiting values of all other element limiting values. The establishment of an element limiting value has thus no effect on the establishment of any other element limiting values. The threshold values may therefore be established in any order of the determined two-dimensional elements. The order in which the element limiting values are established has no effect on the result of the method according to the present invention.

The method according to the present invention may be carried out automatically by a computer. Therefore, the method delivers a repeatable, objective result which is reproducible at any time when needed and is automatically documented.

An operator is freed from routine activities by the method according to the present invention. The operator may focus on checking the finite elements classified as critical and is freed from checking the finite elements determined but proven to be non-critical. Using the method according to the present invention, those areas of the model in which excessively high stresses actually occur are identified automatically. The stresses may be reduced by modifying the model, thus reducing the risk of cracks or material fatigue. The service life may also be extended for the same stress by using a different material without changing the model.

The method then reduces the burden on the operator particularly when the model has a high number of rounded and/or bent edges or when meshing results in many triangles or rigid object elements. In this case, the method filters out those determined finite elements for which excessive stresses have been computed only because of the inaccuracies in the simulation.

The result of the method, namely the classification of determined two-dimensional elements as critical or non-critical, may be used for improving a graphic representation of the model showing the finite elements of the mesh. Such a graphic representation is an important aid for an operator for analyzing the model. In this graphic representation, the two-dimensional elements classified as critical may be highlighted by using the results of the method. As a result, fewer finite elements are highlighted than in the case where all determined finite elements would have been highlighted. This makes the representation clearer and makes it easier for the operator to identify and examine the critical areas.

To automatically classify a determined two-dimensional element as critical or non-critical using the method according to the present invention, only the following data is used for each finite element of the model:
  whether or not the finite element is a two-dimensional element and
  whether or not the finite element is a rigid object element.

In addition, the following data is used for each two-dimensional element:
  whether or not the two-dimensional element is a triangle
  the stress in the two-dimensional element computed in the finite element simulation
  whether one side of the two-dimensional element is adjacent to an adjacent edge of the model
  whether the element is adjacent to a bent edge approximating a radius
  whether a grid point of the two-dimensional element is located in a corner of the model and
  information on whether additional finite elements are adjacent to the two-dimensional element.

Neither additional data of the model nor details of the simulation method or finite element tool used are needed for the classification.

The above-listed data needed for the classification is available early in the product creation process. In general, they are available when the manufacturing process for the industrial system is not yet established and a design model has been produced, but not a physical prototype of the industrial system. Therefore, the method is usable early in the product creation process.

Because no details of the simulation method or finite element tool used are needed, a program implementing the method according to the present invention may be linked to different finite element tools. For example, the data needed by the method may be transferred to the program via a specified information-forwarding interface from the program package used for the finite element simulation. It is also possible to investigate different partial areas of the model using different finite element tools, to forward the partial results via an information-forwarding interface, for example, to the same program for executing the method, and to apply the method to all partial results.

The method, which runs automatically on a computer, needs only relatively few computing steps for each finite element, namely:

computing the stress in the finite element
comparing the stress with the predefined stress limiting value
checking whether the finite element is a two-dimensional element, rather than a rigid object element or a triangle
defining the stress limiting value as the starting value
performing the steps, checking for the associated criteria, and modifying the element limiting value if the corresponding criterion is met, and
comparing the stress with the element limiting value.

Because relatively few computing steps are needed for each finite element, the method may also be used for models having a large number, for example, hundreds of thousands of finite elements. Such models occur, for example, when a finite element simulation close to reality is to be performed for a complete motor vehicle body or a large part thereof, or when the model is split up into very small finite elements due to a complicated geometry.

Due to the relatively low computing time requirements, it is possible to compare models of different industrial systems or different variants, model versions or design states of one industrial system within a reasonable period. For example, models of bodies of different types of automobiles or different alternative design states during the development of a new motor vehicle may be compared. To perform the comparison, the method is executed at least once for each system or each variant or each design state, and the critical finite elements are identified among the determined finite elements.

The stresses and the finite elements in which the stresses occur, the element limiting values determined for each finite element, as well as the steps carried out for each finite element occurring in the industrial system described by the model.

In the method according to the present invention, an element limiting value, which may be different from the predefined stress limiting value, is established for each determined two-dimensional element. A method equivalent to this method, which delivers the same results, includes reducing the computed stress in a two-dimensional element using steps that are similar to those of the method if the criteria are met, and leaving the stress limiting value unchanged. The two-dimensional element is then classified as critical if the reduced stress is greater than the unchanged stress limiting value.

Another equivalent method includes defining further threshold values in addition to the stress limiting value. Depending on which criteria are met by a two-dimensional element and which are not, one of the predefined threshold values is selected and compared with the stress of the two-dimensional element left unchanged. If the stress is greater than the selected threshold value, the two-dimensional element is classified as critical.

In each of the three last steps of a method according to the present invention, the element limiting value is increased if the corresponding criterion is met. The increase may be performed by adding a quantity and/or by multiplying by a factor. The added quantity or multiplying factor may be the same for each step or differ from one step to another. It may be the same for each two-dimensional element or may depend on parameters of the corresponding two-dimensional element.

Advantageous embodiments may establish the parameters of the corresponding two-dimensional element on which the added quantity or multiplying factor preferably depends. Further embodiments may establish additional steps carried out when an element limiting value is established. According to one embodiment, the factor or added quantity furthermore is preferably a function of the partial model to which the determined two-dimensional element belongs.

A high stress at an edge delimiting the model may result in a crack. Therefore, two-dimensional elements at an edge and having high stresses are preferably classified as critical. According to one embodiment of the present invention, the element limiting value for a determined two-dimensional element is reduced if at least one side of the determined two-dimensional element is located on an edge of the model which delimits the model. This embodiment results in a two-dimensional element at an edge of the model being classified as critical for a lower stress than with an otherwise identical two-dimensional element inside the model.

BRIEF DESCRIPTION OF THE DRAWINGS

An exemplary embodiment of the present invention is described in greater detail below with reference to the drawings, in which:#

FIG. 10 shows the curvature of a two-dimensional element.

DETAILED DESCRIPTION

The exemplary embodiment refers to a three-dimensional CAD model of an automobile body. The CAD model functions in this example as a design model, and the body functions as an industrial system. The operational strength of a motor vehicle is predicted during product development by actual tests and also via simulations. In particular, it must be ensured that no damage such as cracks occur in the body during actual operation. Different design states are compared to one another via the tests and simulations in terms of the expected operational strength.

An electronic design model of the body or a partial system thereof to be studied, available to a computer, is generated and predefined for the method. In this example, the model has the form of a three-dimensional CAD model (result E1 in FIG. 1). It includes a plurality of component models for the body components. To generate the model, an operator preferably uses a tool for computer-aided design (CAD tool). A meshing tool, for example, MEDINA, inputs this model using an information-forwarding interface and meshes the model, i.e., splits up the model into finite elements (step S1 in FIG. 1). A finite element mesh is generated by the meshing (result E2 in FIG. 1).

The finite element meshing establishes the grid points and thus the corners of each finite element. The models of the sheet metal parts are split up by the meshing into two-dimensional elements. Because the thickness of the metal sheet is small compared to its extension, each sheet metal part is approximated by a surface. This surface is split up into finite elements which have the form of two-dimensional elements. The grid points of each two-dimensional element are at least approximately in one plane. Roundings of the metal sheet, bent edges, and corners are also approximated by two-dimensional elements, as is a free punch that is made, for example, to make it possible to fold the metal sheet. In the physical reality only rounded corners may be produced, no exact angles. Therefore, corners and bent edges are only approximately reproduced in the finite element mesh.

Figure 2:
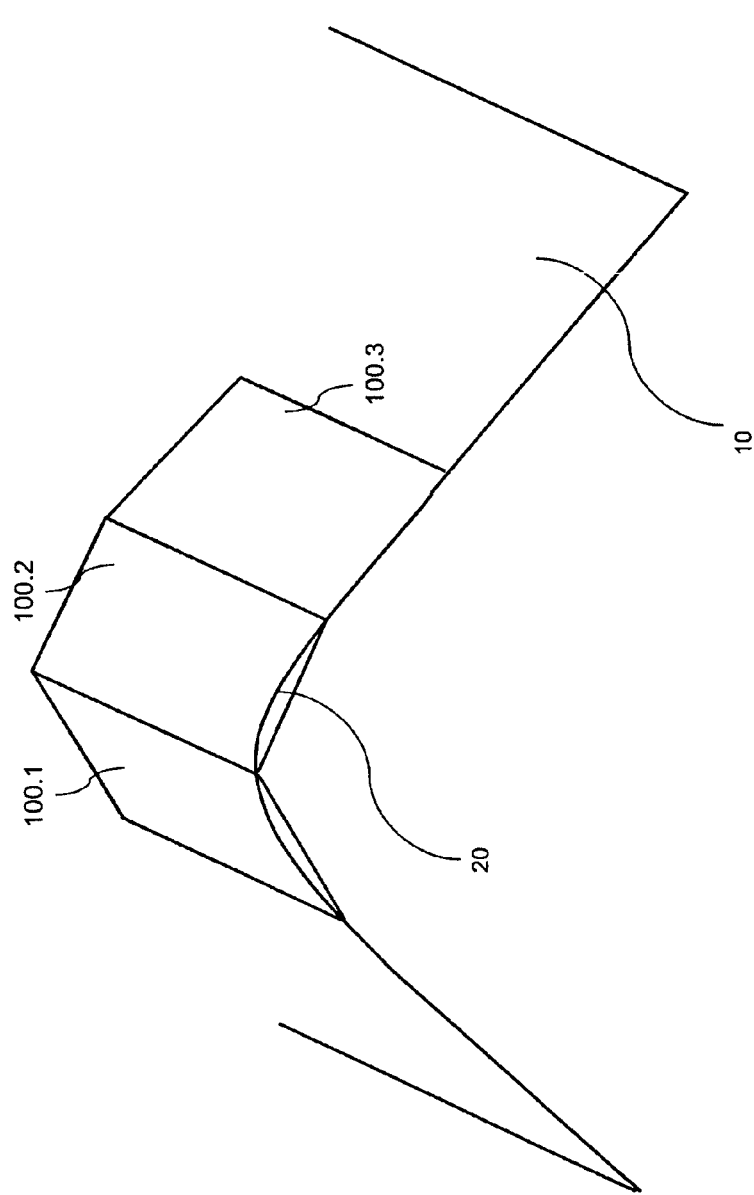
FIG. 2 shows an approximation of a bent edge by two-dimensional elements.

FIG. 2 shows the approximation of a bent edge by two-dimensional elements. A metal sheet 10 has a rounded bent edge 20. In the meshing of metal sheet 10, three two-dimensional elements 100.1, 100.2, and 100.3 are generated. Rounded bent edge 20 is approximated by two flat two-dimensional elements 100.1, 100.2. The rounding is thus approximated by a set of connected lines.

Figure 3:
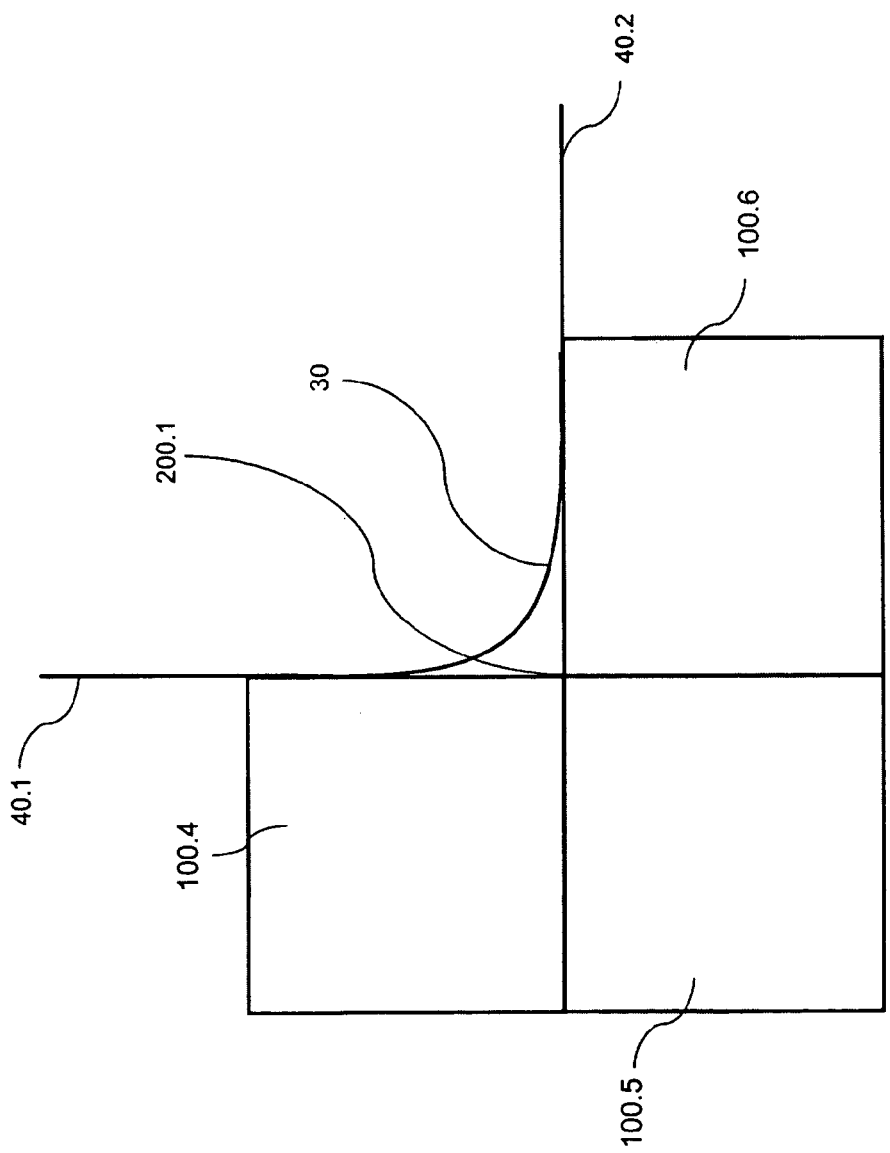
FIG. 3 shows the approximation of a rounded corner by two-dimensional elements.

FIG. 3 illustrates the approximation of a rounded corner 30 by three flat two-dimensional elements 100.4, 100.5, and 100.6. Corner 30 is located between two edges 30.1 and 30.2, which delimit the model. Point 200.1 is located in the rounded corner and is a grid point of finite elements 100.4, 100.5, and 100.6.

A joint between sheet metal parts is modeled here by a volume element. Examples of such joints are spot welds and welded seams, as well as adhesive joints or joints produced using a laser beam. Modeling via volume elements permits stresses and displacements to be accurately investigated within a volume element. The volume elements are joined to the two-dimensional elements of the metal sheets via rigid object elements. Such a rigid object element represents, for example, the area between a welded or glued joint and a joined metal sheet.

A meshing tool described above, for example, MEDINA, functions as a pre-processor for a finite element tool which performs the finite element simulation. Those skilled in the art are familiar with different finite element tools, for example, MSC.NASTRAN, described at http://www.mscsoftware.com/assets/337_PA_LT-DAT-V2001.pdf, consulted on Aug. 14, 2003, ABAQUS/Standard, described at http://www.hks.com/reference/epaper/ABAQUS_Standard_63.pdf, consulted on Aug. 14, 2003, PAMCRASH for finite element simulations of collisions, described at http://www.esi-group.com/Numerical-Simulation/index_html #a1, consulted on Aug. 14, 2003, and in E. Haug, J. Clinckemaillie, X. Ni, A. K. Pickett, Th. Queckborner: "Recent Trends and Advances in Crash Simulation and Design of Vehicles,"

available at http://www.esi-group.com/Finite_elements_analysis/Finite_elements_analysis/Publications/recent_trends.zip, consulted on Aug. 14, 2003.

The software program ADRIAN, described in H. Sandstrom and M. Shamlo, op. cit., which inputs CAD models in IGES data format, generates a finite element mesh, and outputs it in the NASTRAN data format, may be used as a preprocessor.

Load cases, i.e., loads on the car body due to driving situations, are predefined for the finite element simulation. These predefined load cases result either from bureaucratic specifications such as legal provisions or company-internal specifications, or from tests using an actual vehicle manufactured based on the model. The vehicle is tested on a test track and subjected to a set of loads from different driving situations such as, for example, 1000 km drive over uneven terrain. In these driving situations certain loads on the vehicle and certain velocities and accelerations in the direction of travel and across that direction, which vary over time, are produced. The forces and moments thus generated, which vary over time, are measured by sensors, for example, in the wheel hubs.

Fifteen static equivalent load cases, for example, featuring certain forces and moments, which describe the maximum loads in typical driving situations or driving maneuvers, are derived from these time-variable load cases with the help of the measured forces and moments. These equivalent load cases deliver the loads on the car body. The procedure described below is preferably performed for each of these load cases, whereby the effects of different load cases on the car body are determined and compared to one another.

Figure 1:
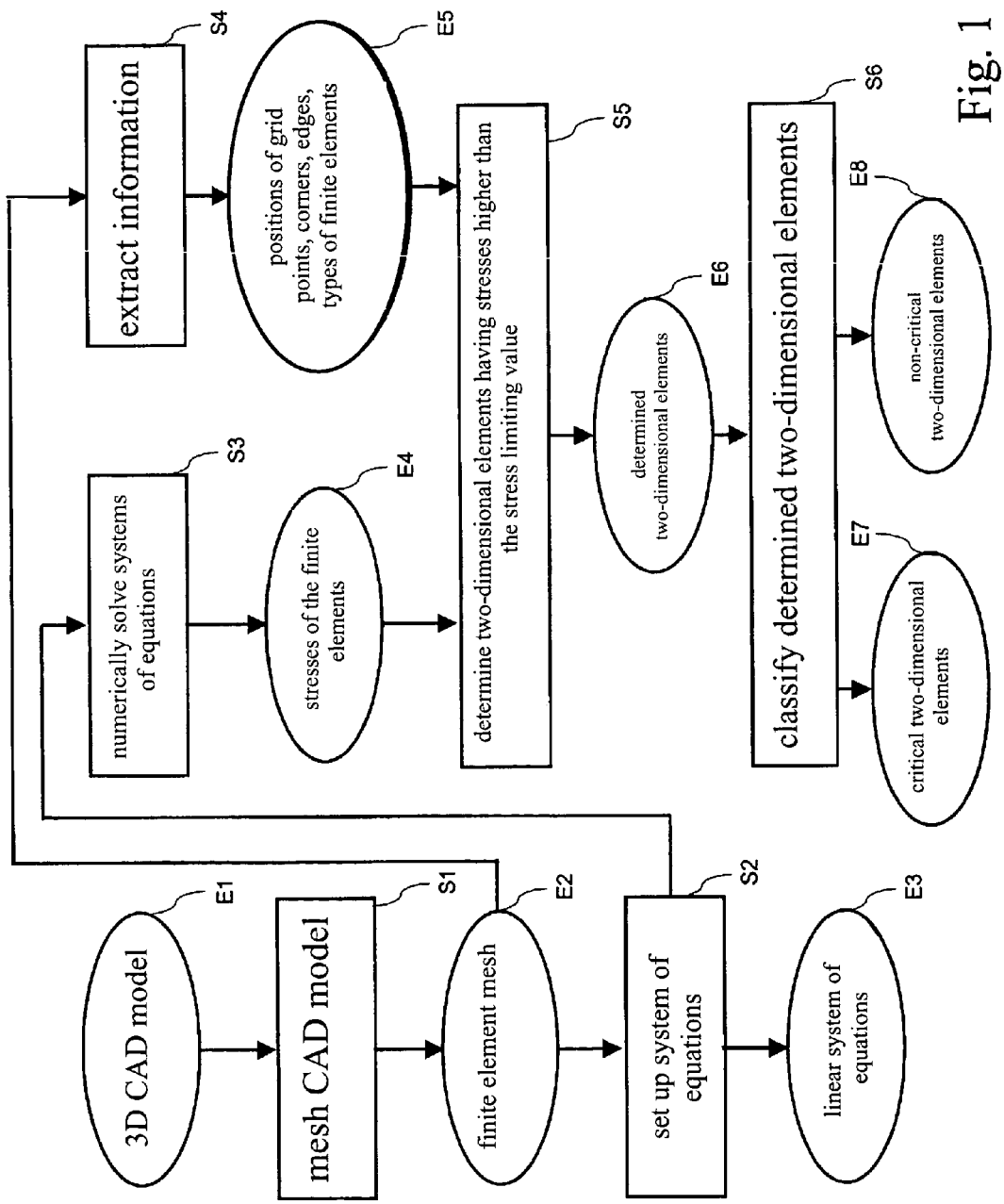
FIG. 1 shows a flow diagram illustrating the exemplary embodiment of the method according to the present invention.

According to the finite element method, systems of equations are set up (step S2 and result E3 in FIG. 1). Displacements of the grid points and/or stresses in points of integration of the finite elements are used as unknowns of these systems of equations. The equations are set up using physical dependencies and relationships among the grid points. The systems of equations are solved numerically (step 3 in FIG. 1). The stresses in the points of integration of the finite elements are thus computed.

The method of setting up systems of equations and performing such a finite element simulation is described, for example, in B. Klein, op. cit., Dubbel, op. cit., and T. R. Chandrupalta and A. D. Belegundu, op. cit. The relationship $F=K*u$ exists between the forces acting from the outside and the resulting displacements of the grid points, where F is the vector of the acting forces, u is the vector of the displacements, and K is the symmetrical stiffness matrix (generalized spring characteristic). To model the displacements, differential equations are set up. A bilinear approach is preferably selected. The displacement of a point on one side of a finite element is a linear function of the distance of this point from the grid point. This bilinear approach is also an approximation resulting in increased stiffness, in particular for triangles and elongated finite elements, i.e., for elements having a large longest to shortest side quotient. The system of equations $F=K*u$, which is linear in this case, is solved. The relationship $\in=D*u$, where D is a differential matrix, exists between vector u of the displacements and vector $\in$ of the distortions in the grid points. This differential matrix combines derivatives of displacements by the segments in different directions and/or different orders. The relationship $\sigma=E*\in$ applies between vector $\sigma$, to be determined, of the stresses in the points of integration and vector $\in$ of the distortions, where E is an elasticity matrix. After computing the displacements by solving the equation F=K*u, the stresses in the points of integration of the finite elements are computed in a subsequent second step.

Two-dimensional elements are preferably treated as isoparametric elements and mapped onto unit elements, which is described, for example, in B. Klein, op. cit., Sections 7.2 and 7.4. Stiffness matrix K of the system is composed of element stiffness matrices. Double integrals are to be solved here. These double integrals are preferably determined numerically using Gauss's quadrature formulas. These quadrature formulas require interpolation points to be defined in the two-dimensional elements, for example, four or nine interpolation points in a quadrangle. These interpolation points are selected in such a way that linear functions are integrated exactly and function as the points of integration of the finite element; they are also known as material points. This numerical integration is described, for example, in B. Klein, op. cit., Section 7.2.10.

The stresses of the finite elements are computed from the stresses in the points of integration, which is the result E4 of FIG. 1. For example, the highest value of the stresses in the points of integration of the finite element or the average value of the stresses in the points of integration of the finite element is used as the stress of the finite element.

The following data about a finite element is extracted from the finite element mesh via an additional information-forwarding interface (step S4 in FIG. 1) and transmitted to a program which executes the method according to the present invention:

an identifier of the component model to which the finite element belongs
   an identifier of the finite element
   determination as to whether the finite element is a two-dimensional element or a volume element or a rigid object element
   if it is a two-dimensional element, whether it is a triangle, a quadrangle, or another type of two-dimensional element
   the positions of all grid points of the finite element
   for each corner of the model, the positions of the corner point, the radius of the rounding of this corner and the angle between those two edges of the model which delimit the rounded corner
   the number of sides of the finite element which are adjacent or close to a delimiting edge of the model in such a way that no other finite element is located between the side and the delimiting edge, and
   the number of sides of the finite element adjacent to a bent edge of the model.

In general, the two-dimensional elements of the finite element mesh are exclusively triangles having three grid points and quadrangles having four grid points. In addition, the model often includes volume elements and rigid object elements.

The knowledge of what materials are used for manufacturing the car body according to the model is used for determining the stress limiting value and preferably also the added quantities, subtracted quantities or factors of the method steps. This knowledge is not needed for checking the criteria of the steps.

The stress in the finite element, computed as described above, is extracted from the result of the finite element simulation (result E4 in FIG. 1).

The identifier of a component model is unique within the entire model. The identifier of a finite element is unique within the corresponding component model. Because each side of a finite element is a set of connected lines between two grid points, the position in space and dimensions of each two-dimensional element may be uniquely reconstructed from the positions of the grid points.

The positions of the grid points of the two-dimensional elements and the information as to which additional two-dimensional elements are adjacent to which other two-dimensional elements are preferably generated from the finite element mesh. This configuration takes into account the possibility that different grid points of different finite elements have the same position. In this way a crack propagation, for example, which results at two grid points initially having the same position but then assuming different positions due to the crack, may be simulated. In the finite element mesh each finite element and each grid point has a unique identifier.

The information as to which additional two-dimensional elements are adjacent to which other two-dimensional elements is preferably represented by a non-oriented neighborhood graph. Each grid point of this neighborhood graph represents one two-dimensional element. Two grid points are connected by an edge if both represented two-dimensional elements are fully or partially adjacent to one side. The grid points for two two-dimensional elements which have only one point in common are not connected by an edge. This graph is stored in the form of a quadratic symmetrical matrix, for example, in which the rows and edges represent the grid points and a "1" in a matrix element stands for a connection between two grid points.

The following information is extracted from the finite element mesh or from the positions of the grid points of the two-dimensional elements:
   the surface area of the two-dimensional element
   the lengths of the sides of the two-dimensional element
   the longest to shortest sides quotient, and
   the torsion of the two-dimensional element.

This information, as well as the neighborhood graph, may be reused when the method according to the present invention is executed for the same finite element mesh, but with different stress limiting values or step factors, for example. Therefore, both this information and the neighborhood graph are preferably stored.

A stress limiting value is predefined for the stress of a finite element. This stress limiting value has the same dimension as the computed stresses, for example, MPa, and is often a function of the simulated load case. Furthermore, the stress limiting value is a function of parameters of a material which is used for manufacturing the industrial system in question. In the case where the shell of the car body is essentially made of steel, these are the following parameters of the steel used:
   its yield point
   its notch sensitivity
   parameters of the steel according to the Wöhler diagrams (Dubbel, op. cit. E11).

In the case of a newly produced design model of the body and/or in the case of a new material, the stress limiting value is preferably determined on the basis of the first three parameters, which depend on the material.

The results of the finite element simulation are then preferably checked as described above via tests on actual motor vehicles. For this purpose, an actual car body is constructed according to the model. Tests are conducted with this body on the test bench and/or in driving operation. Certain driving situations and thus loads are applied, for example, those predefined by the load cases. The service life achieved by the car bodies is determined. If the determined, i.e., actual service life significantly differs from a predefined target service life, the stress limiting value is adjusted. For example, the rule of thumb that a 10% reduction in stress results in doubling of the service life is used. From this 10% rule of thumb the following formula results for predefining the new stress limiting value σ_new on the basis of the test:

$$\frac{\text{LD\_soll}}{\text{LD\_alt}} = 1024 * e^{-\ln(1024)\frac{\sigma\_\text{neu}}{\sigma\_\text{alt}}}$$

where:

LD_soll = LD_target

LD_alt = LD_old

σ_neu = σ_new

σ_alt = σ_old where LD_soll [LD_target] is the target service life, LD_alt [LD_old] is the service life determined in the test, and σ_alt [σ_old] is the previously used stress limiting value, determined exclusively on the basis of material parameters, for example.

It is possible for different stress limiting values to be predefined for different partial models of the car body. For example, different service lives are determined by the tests for different areas of the car body. According to the formula resulting from the 10% rule of thumb, different stress limiting values are established for these areas, so that the entire body achieves the predefined target service life.

Figure 4:
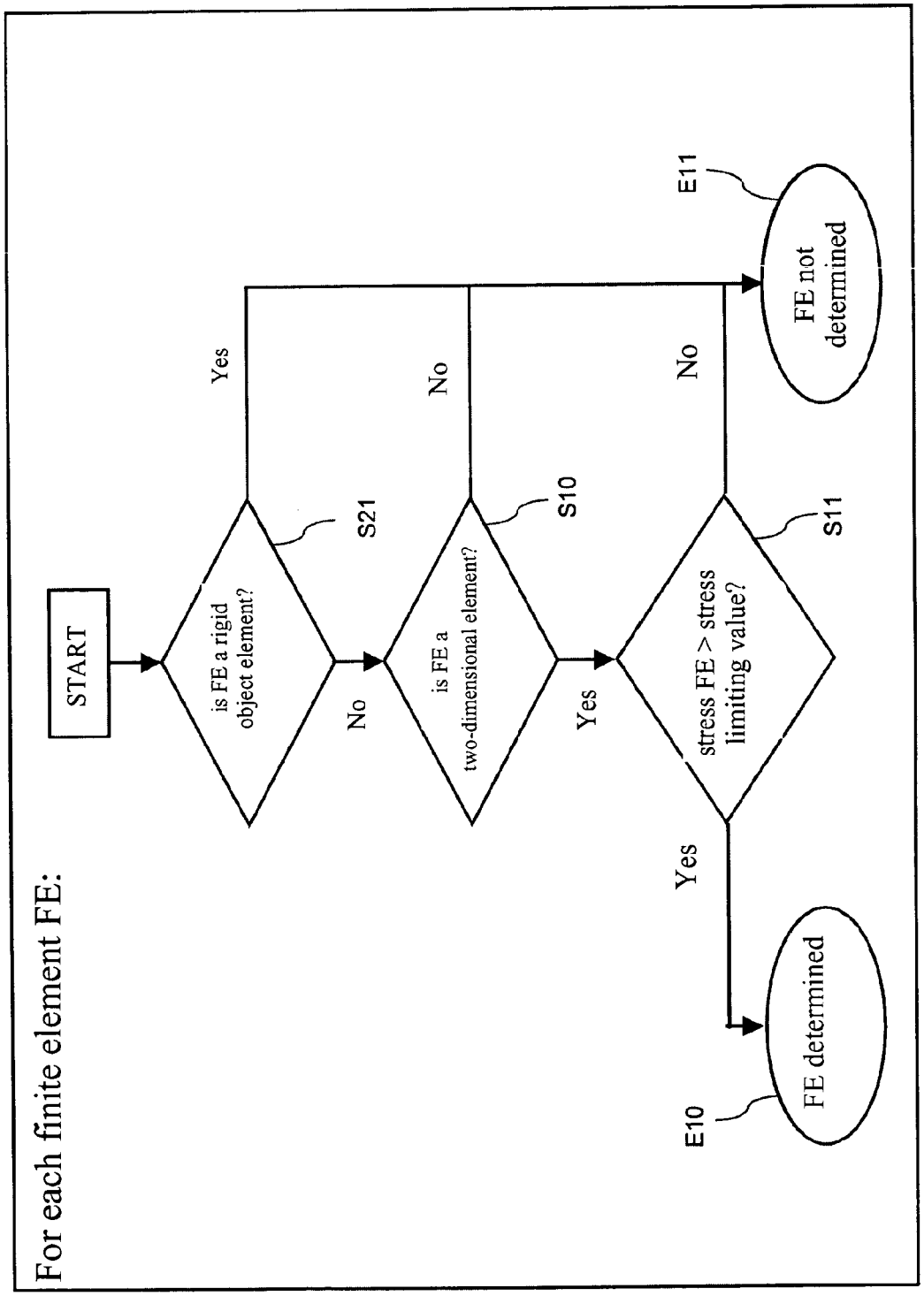
FIG. 4 shows the determination of finite elements.

Each finite element that is a two-dimensional element rather than a rigid object element and whose stress exceeds the predefined stress limiting value is determined (step S5 in FIG. 1 and FIG. 4). A rigid object element rigidly connects grid points of other finite elements, has zero degrees of freedom, and represents reality only with approximation. Therefore, a rigid object element is basically not determined and therefore not classified as critical, which is ensured by step S21 in FIG. 4.

FIG. 4 shows in detail how finite elements are determined, i.e., step S5 of FIG. 1. The determined two-dimensional elements are investigated by the procedure described below (step S6 in FIG. 1 and FIG. 5). In general, some of the determined two-dimensional elements are classified as critical; however, it is also possible that most or that no two-dimensional elements are classified as critical. As a result, the procedure yields the critical two-dimensional elements (result E7 in FIG. 1) and the determined, but not critical two-dimensional elements (result E8 in FIG. 1).

The positions and dimensions of the two-dimensional elements classified as critical indicate those areas of the car body described by the model in which a risk of material fatigue or cracks exists, for example. The design skill and knowledge of industrial mechanics are required for reducing the stresses in those areas and thus preventing cracks from occurring. This is effected in particular by changing the model, for example, by changing the radius of a rounding or the angle of a bent edge or by increasing the thickness of a metal sheet. Alternatively, another material may be provided.

Figure 5:
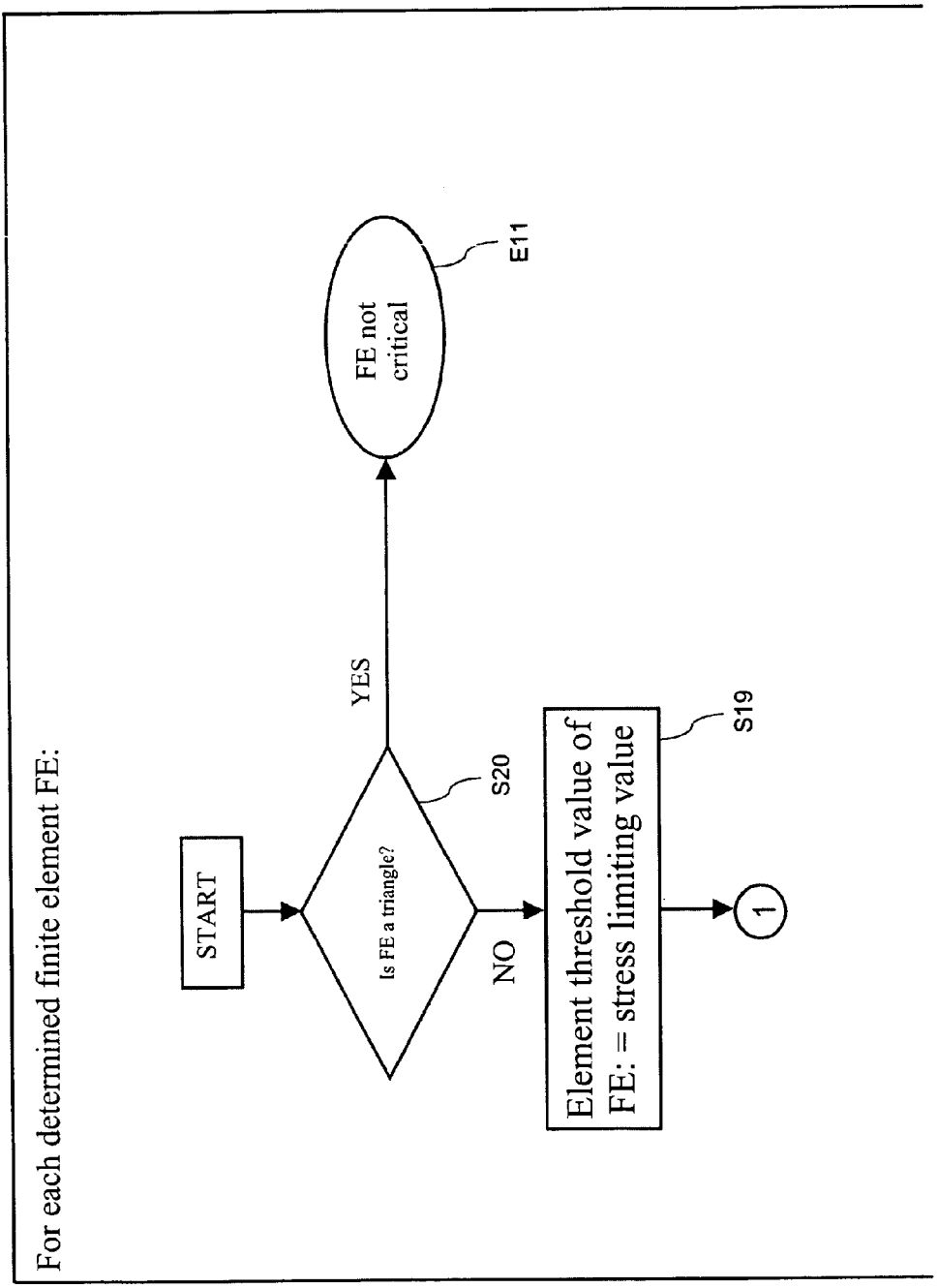
FIG. 5 shows the establishing of the element limiting value for a determined two-dimensional element FE and the classification of which determined two-dimensional elements are critical.

A check is performed to see whether the determined two-dimensional element FE to be investigated is a triangle (step S20 in FIG. 5). A triangle is basically not classified as critical (result E11 in FIG. 5), because a triangle has fewer grid points and points of integration than a quadrangle, which for example has an effect in the function used for the displacements of its points. Therefore, a triangle is very rigid and thus produces stresses in the simulation which are excessive compared to reality.

An element limiting value is determined for each determined two-dimensional element which is not a triangle. The predefined stress limiting value is used as a starting value for establishing the element limiting value (step S19 in FIG. 5). Each step preferably includes one criterion and one computing operation. The computing operation of a step is performed when the criterion of the step is met; otherwise it is not. The computing operation includes modifying the element limiting value, for example, by increasing by x % or by y MPa. Each computing operation preferably includes an increase or a reduction of the element limiting value by at least 5% of the old value or by a constant which is at least 5% of the starting value. The order in which the steps are performed and the criteria are checked has no effect on the result, i.e., on establishing the element limiting value and on the classification of the two-dimensional elements as critical or non-critical, if only multiplications by a factor or the addition of a quantity are performed, but not both.

In particular, the following steps are performed:

A determined two-dimensional element FE which is adjacent to a triangle has an excessive stress due to the fact of being adjacent. A check is therefore performed to see whether a side or a grid point of FE is adjacent to a side of a triangle (step S22 in FIG. 5). This criterion is met if a side of FE is fully or partially adjacent or if a grid point of FE is located on a side of the triangle. If this criterion is met, the computing operation Op_1 is performed (step S23 in FIG. 5), increasing the element limiting value of FE.

The factor or added quantity by which the previously computed element limiting value is increased in computing operation Op_1 is preferably determined as a function of the following parameters:

The surface area of two-dimensional element FE is determined. The smaller the two-dimensional element, the greater the effect of the excessive stress in the corner on the two-dimensional element and the greater the deviation from reality. Therefore, the smaller the two-dimensional element, the greater the factor or added quantity.

The surface area of the triangle is preferably determined. The greater the triangle, the greater its influence on the adjacent two-dimensional elements due to its excessive own stiffness. Therefore, the larger the triangle, the greater the factor or added quantity.

The number of additional determined two-dimensional elements, one side of which is fully or partially adjacent to the two-dimensional element being examined and no side of which is fully or partially adjacent to the triangle, is determined. The greater the number of additional determined two-dimensional elements adjacent to the two-dimensional element being examined but not adjacent to the triangle, the greater the number of two-dimensional elements that are influenced by the stress of the triangle even in reality and the more critical this stress is. Therefore, the larger the determined number, the smaller the factor or added quantity.

Similarly, a determined two-dimensional element FE adjacent to a rigid object element has an excessive stress due to the fact of being adjacent. Therefore, a check is performed to see whether a side or a grid point of FE is adjacent to a side or a grid point of a rigid object element (step S24 in FIG. 5). If this criterion is met, computing operation Op_2 is performed (step S25 in FIG. 5), which increases the element limiting value of FE by a factor or an added quantity. The factor or added quantity by which the previously computed element limiting value is increased is preferably computed as a function of the above-described parameters.

In the simulation, a corner or a free punch results in excessive stress in those points of integration of the two-dimensional element which are located close to the corner or the free punch. A corner occurs in the mesh, for example, if a rounding of a metal sheet is approximated by a plurality of two-dimensional elements. A two-dimensional element in a corner or a free punch therefore inevitably has an excessive stress; in reality, the corners and free punches are rounded. Therefore, a check is performed to see whether a grid point of the determined two-dimensional element FE is located at a rounded corner of the model (step S26 in FIG. 5). If this criterion is met, computing operation Op_3 is executed (step S27 in FIG. 5), which increases the element limiting value of FE.

The factor or added quantity by which the previously computed element limiting value is increased is preferably determined as a function of the following parameters:

- The angle of the corner is determined. For this purpose, two two-dimensional elements are determined, one grid point of each being located in the corner and one side of each forming the corner. The angle between these two sides is computed and the difference between this angle and 180° is derived. The greater this difference, the more critical this corner is in reality and the smaller the factor or the added quantity.
- The surface area of two-dimensional element FE is determined. The smaller the two-dimensional element, the closer to the corner are the points of integration located and the greater the influence of the corner or free punch on the stresses in the points of integration. Therefore, the smaller the two-dimensional element, the greater the factor or added quantity.
- The number of additional determined two-dimensional elements, one side of which is fully or partially adjacent to the two-dimensional element being examined and which have no grid point in the corner, is determined. The greater the number of additional determined two-dimensional elements adjacent to the two-dimensional element being examined but having no grid point in the corner, the greater the number of two-dimensional elements that are influenced by the stress in the corner even in reality and the more critical this stress is. Therefore, the larger the determined number, the greater the factor or added quantity.
- According to a further embodiment, the degree of approximation error is determined from the comparison of the finite element mesh and the predefined model and used for determining the factors and/or added quantities.
- In particular, the radius of the rounding is also determined in this embodiment. The smaller this radius, the more critical the high stress is and the smaller the factor or added quantity. This radius is a component of the model. Typically it does not occur in the finite element mesh and is determined via an additional interface to the model.

A determined two-dimensional element is classified as critical if one of its sides is located on an edge delimiting the model. Due to the high stress, there is a high risk of a crack forming at this point and propagating later during the operation of the vehicle. Cracks form more easily at the free edges than at other points. Therefore, a check is performed to see whether a side of FE is located on an edge delimiting the model (step S28 in FIG. 5). If this is the case, computing operation Op_4 is performed (step S29 in FIG. 5). In Op_4 the element limiting value is reduced by a factor or a subtracted quantity. As a result, two-dimensional element FE is classified as critical even if its element limiting value is increased in another step.

A contiguous area of determined two-dimensional elements indicates high stresses even in reality. An individual isolated determined two-dimensional element, on the other hand, is usually not critical unless it is located on an edge of the model. Therefore, a check is performed to see whether none of the sides of the determined two-dimensional element is located on an edge of the model delimiting the model and none of the sides of the determined two-dimensional element is fully or partially adjacent to another determined two-dimensional element (step S30 in FIG. 5). If both criteria are met, computing operation Op_5 (step S31 in FIG. 5) is executed. In Op_5 the element limiting value is substantially increased.

The excessive stress in a triangle and the stiffness of a rigid object element may affect not only the directly adjacent two-dimensional elements, but also the two-dimensional elements "in the second row," i.e., those that are not adjacent to the triangle or the rigid object element, but are adjacent to an adjacent two-dimensional element. A check is performed to see whether FE in the second row is adjacent to a triangle or rigid object element (step S32 in FIG. 5). The element limiting value of a two-dimensional element "in the second row" is easily increased by computing operation Op_6 (step S33 in FIG. 5).

A rounded bent edge is modeled for the meshing by one or more two-dimensional elements approximating the rounding. Such a bent edge and the approximation by a two-dimensional element is shown in FIG. 2. The approximation often results in two-dimensional elements whose stresses exceed the stress limiting value. In that case, the sharp bent edge, which occurs during the approximation of the rounded bent edge via two-dimensional elements but does not exist in reality, results in an excessive stress. Therefore, a check is initially performed to see whether two determined two-dimensional elements, one side of which is fully or at least partially adjacent to one another, are in the same plane or form an angle to one another step S34 in FIG. 5). In the second case the two two-dimensional elements belong to the approximation of a rounded bent edge; in the first case they do not. In the second case, computing operation Op_7 is performed (step S35 in FIG. 5), in which the element limiting value is increased. The angle between the two two-dimensional elements is preferably determined and the smaller the angle, the greater the factor or the added quantity by which the element limiting value is increased.

Furthermore, the geometric quality of determined two-dimensional element FE is preferably determined and checked (step S36 in FIG. 5). If FE has a poor geometric quality, the element limiting value is increased in computing operation Op_8. In this exemplary embodiment, the geometric quality depends only on the meshing of the model, but not on the effect of the load cases on the finite element meshing or on other data of the model. Therefore, the geometric quality is determined once for the finite element meshing and reused for all load cases. In simulations for determining the operational strength, linear equations are usually solved; in this way the load case does not modify the geometric quality of a finite element.

Figure 6:
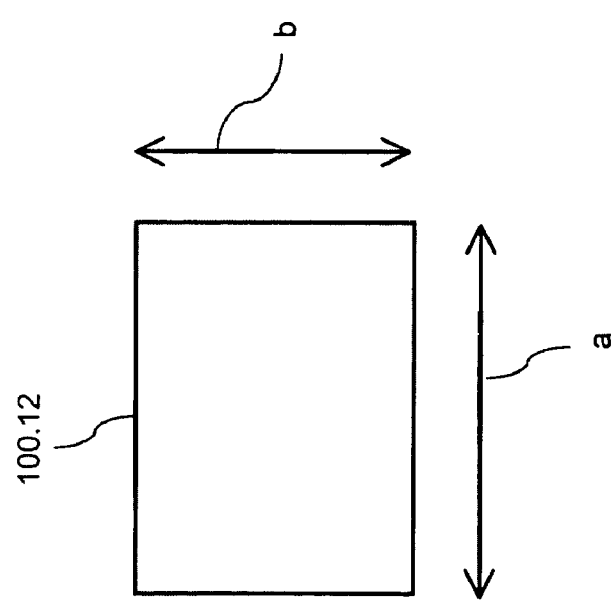
FIG. 6 shows the aspect ratio of a two-dimensional element.

The geometric quality is preferably determined and checked using the following parameters:

- FIG. 6 shows a two-dimensional element 100.12 having the length of the largest side a and of the smallest side b. If the a to b ratio exceeds a certain predefined geometric threshold value, for example, 4, the element limiting value is increased, for example, the greater the a/b quotient, the more the element limiting value is increased.

The torsion of a two-dimensional element indicates how much the two-dimensional element differs from a flat two-dimensional element. If all grid points of the two-dimensional element are located in one plane, the torsion is 0. The torsion of a two-dimensional element is computed as follows, for example: an equalizing plane is computed through the grid points of the two-dimensional element using the smallest squares or the minimum sum of distances method. The maximum angle between one edge of the two-dimensional element and the equalizing plane is referred to as torsion.

Figure 7:
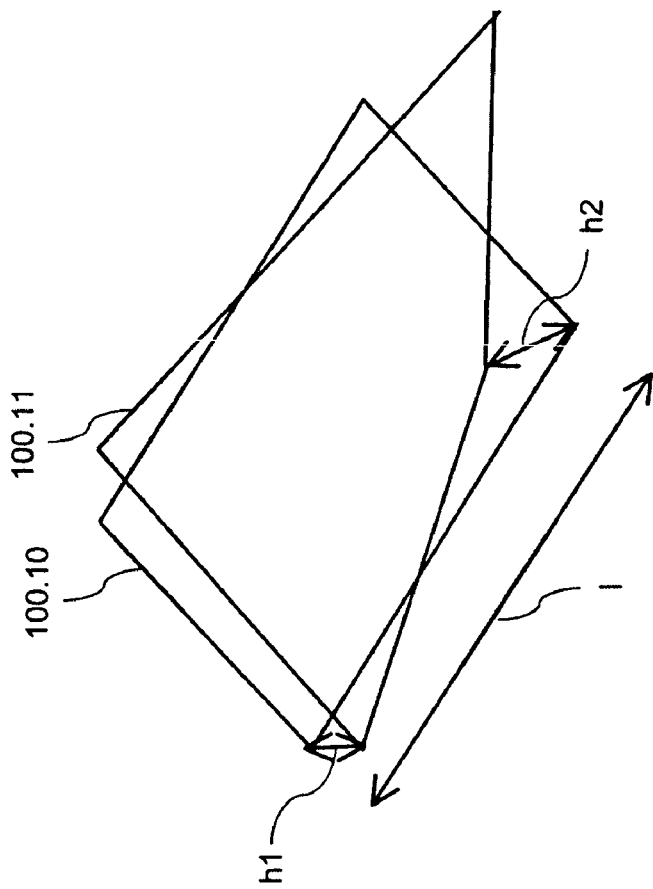
FIG. 7 shows the distortion of a two-dimensional element.

FIG. 7 shows a distorted two-dimensional element 100.11 and a two-dimensional element 100.10 near 100.11, having parallel opposite sides. The difference between 100.11 and 100.10 is computed. The amount of displacement required for the two grid points on one side of 100.10 to arrive at 100.11 is computed for each side. FIG. 7 shows as an example one side having length 1 and two displacements by distances h1 and h2. The quotient [max (h1, h2)/1]*100% is used as the distortion. This procedure is performed for each side and the distortion of 100.10 is thus computed. If the distortion is greater than a predefined threshold value, for example, 5%, the element limiting value is increased.

Figure 8:
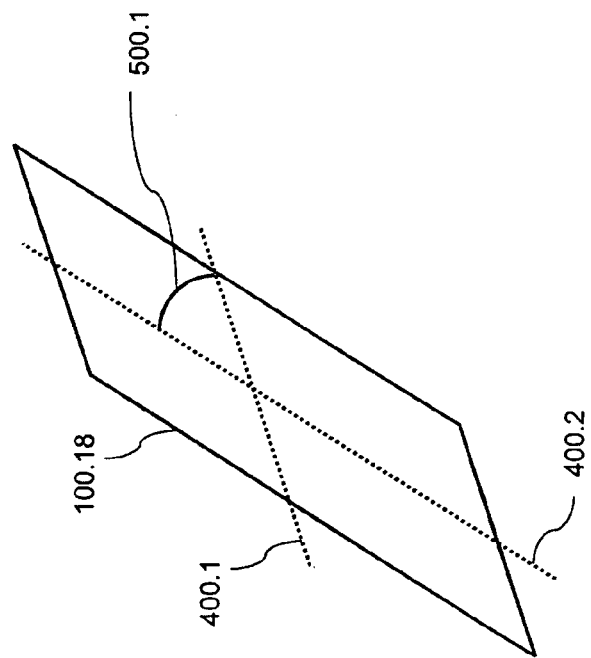
FIG. 8 shows the skew of a two-dimensional element.

FIG. 8 shows a two-dimensional element 100.18 having two straight lines 400.1 and 400.2, which bisect two sides each of 100.18. The skew, i.e., the smaller angle 500.1 of the two angles between 400.1 and 400.2 is computed. The skew is between 0° and 90°; in the case of a rectangle it is 90°. If the skew is less than a predefined threshold value, for example, 30°, the element limiting value of 100.18 is increased.

Figure 9:
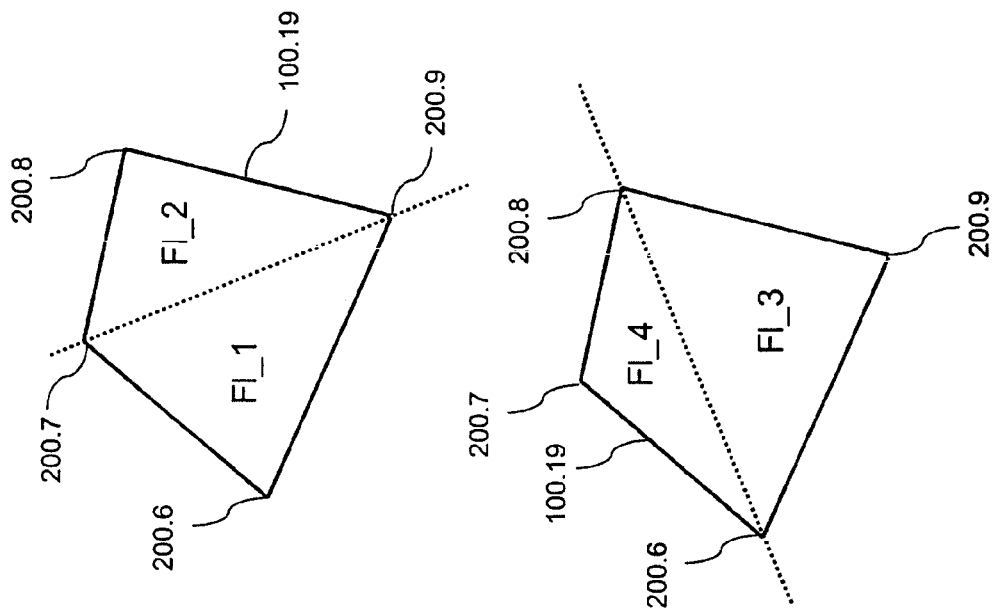
FIG. 9 shows the taper of a two-dimensional element.

FIG. 9 shows the same two-dimensional element 100.19 twice. Surfaces F1_1, F1_2, F1_3, and F1_4 indicated in FIG. 9 are computed, in addition to surface F1 of 100.19. F1_1 is the surface of the triangle having grid points 200.6, 200.7, and 200.9 as vertices. The following four values are computed:

$Sch\_1 = |4*F1\_1 - F1|/F1$ $Sch\_2 = |4*F2\_2 - F1|/F1$ $Sch\_3 = |4*F3\_3 - F1|/F1$ $Sch\_4 = |4*F4\_4 - F1|/F1$

If 100.19 is a rectangle, the following applies: Sch_1=Sch_2=Sch_3=Sch_4=0. The largest of these four values is considered the taper, i.e.,
Sch=max {Sch_1, Sch_2, Sch_3, Sch_4}. If taper Sch is greater than a predefined threshold value, for example, greater than 0.5, the element limiting value of 100.19 is increased, for example, the greater Sch is, the more the element limiting value is increased.

FIG. 10 shows on the right a two-dimensional element 100.21 and on the left a two-dimensional element 100.20, which is obtained after a transformation of 100.21 into a natural system of coordinates. The transformation is performed in such a way that grid point 200.10 of two-dimensional element 100.21 is mapped onto the grid point having coordinates (−1, +1) of two-dimensional element 100.20; 200.11 is mapped on (+1, +1); 200.12 is mapped on (−1, −1); and 200.13 is mapped on (+1, −1). The following applies:

$dx*dy = |det(J)|*d\xi*d\eta$, where J is the Jacobi matrix of the transformation. Curvature dis is determined according to the formula $dis = |det(J)|*F1(100.21)/F1(100.20)$, where F1 (100.21) is the surface area of 100.21 and F1 (100.20) is the surface area of 100.20. If curvature dis is less than a threshold value, for example, 0.7, the element limiting value of 100.21 is increased, i.e., the smaller the curvature, the more the element limiting value is increased.

It is also possible that the degree of increase by computing operation Op_8 is a function of the geometric quality of FE, for example, the greater the distortion or the taper, the greater the degree of increase.

After completing the steps, the element limiting value established by the steps is compared with the computed stress of the finite element (result E4 in FIG. 1) (step S38 in FIG. 5). If the computed stress is greater than the established element limiting value, FE is classified as critical (result E14 in FIG. 5); otherwise it is classified as non-critical (result E13 in FIG. 5).

In particular, in the case of models having many finite elements classified as critical, a ranking of these critical elements is preferably established. Using this ranking, the particularly critical elements and thus the particularly critical areas of the model are identified. Modified designs focus on reducing stresses in these particularly critical areas.

Ranking is performed as follows: in a subsequent step S39, the degree of criticality is determined for each determined two-dimensional element FE which is neither a triangle nor a rigid object element as a quotient of the stress in FE, which has been computed by the finite element simulation, and the element limiting value established for FE. If FE is a critical finite element, this quotient is greater than 1; otherwise it is less than or equal to 1. Modified designs preferably focus on areas in which finite elements having a high degree of criticality are located.

For example, points of application-of loads, for example, bumper consoles, are often exposed to high stresses. A combination of actual physical stresses and the effects of the approximation by rigid object elements occurs at these points of application of loads. The finite element simulation provides mostly high stresses. The element limiting value for a 1-g sink, for example, using steel type DP500 is determined by the method in such a way that the quotient is greater than 1 only when the console is actually overloaded and damage occurs during testing.

Subsequently each critical two-dimensional element is assigned to one of a plurality of possible degrees of criticality, for example, "less critical" or "very critical." A two-dimensional element is evaluated as "very critical," for example, if its degree of criticality is greater than 1.5; otherwise it is evaluated as "less critical."

Design modifications are preferably introduced in critical areas of the car body described by the model. To identify these areas, contiguous areas of critical two-dimensional elements are identified. The neighborhood graph is preferably used for this identification. Each grid point of this graph that represents a critical two-dimensional element is marked. Each partial graph of the neighborhood graph, containing exclusively the marked grid points, is determined. Such a partial graph may contain a single grid point or a plurality of grid points. The grid points of such a partial graph represent the two-dimensional elements of a contiguous area of critical two-dimensional elements. "Contiguous" means that one side of each two-dimensional element of the area is fully or partially adjacent to at least one other two-dimensional element of the area, and any two points of the area may always be connected by a segment which runs entirely within the contiguous area.

The following parameters are determined for the contiguous areas:
- surface area of the area,
- center of gravity of the area,
- number of two-dimensional elements of this area,
- maximum value of all stresses of the two-dimensional elements of the area,
- average value of all stresses of the two-dimensional elements of the area,
- maximum value of all degrees of criticality, i.e., all quotients of stresses and element limiting values of the two-dimensional elements of the area,
- average value of all degrees of criticality, i.e., all quotients of stresses and element limiting values of the two-dimensional elements of the area,
- number of triangles and rigid object elements adjacent to at least one two-dimensional element of the area.

An evaluation of the contiguous area is derived on the basis of these parameters. The surface area and the center of gravity, as well as the evaluation of the area are preferably stored. The effect of a modified design may thus be determined. The modified design yields an additional design model. This additional model is also meshed, which yields an additional finite element mesh. The method according to the present invention is performed again, this time for the additional model having the additional finite element mesh. The contiguous areas of critical two-dimensional elements of the model and those of the additional model may be compared using the particular centers of gravity, surface areas, and evaluations.

In addition, the component models are preferably evaluated using at least one of the following component parameters:
- number of determined two-dimensional elements belonging to the component model,
- number of critical two-dimensional elements belonging to the component model,
- number of two-dimensional elements of the component model having the highest degree of criticality,
- maximum stress of a two-dimensional element of the component model,
- maximum degree of criticality of a two-dimensional element of the component model,
- average value of the stresses of the critical two-dimensional elements of the component model,
- average degree of criticality of a two-dimensional element of the component model,
- center of gravity and dimension of a contiguous area of determined two-dimensional elements of the component model, and
- center of gravity and dimension of a contiguous area of critical two-dimensional elements of the component model.

A computing engineer checks this automatically generated documentation of the model. He may overwrite individual evaluations and justifies and documents his changes.

The procedure just described is preferably performed for each static equivalent load case. It is possible to compare the load cases, for example, using the size of the contiguous areas of critical two-dimensional elements in the particular load case. The load case resulting in the largest contiguous areas is identified as the most critical load case for this area. Further investigations are preferably performed for this load case first. If a model withstanding this load case in the simulation is found, there is a good probability that the model and the modeled car body withstand all other load cases.

A documentation of the model which includes component documentations for the component models is preferably generated. For example, each component documentation includes a detail table having one row for each determined two-dimensional element. The table includes one column for each of the following pieces of information:
- an identifier of the two-dimensional element which is unique in the component model,
- an indication of whether or not the two-dimensional element has been classified as critical, and a degree of criticality,
- the criterion which resulted in the classification of a two-dimensional element as critical.

Furthermore, a component table is generated for each component model, which is also part of the documentation. This table includes the following data for each column:
- a unique identifier of the component model,
- the highest stress of a finite element of the component,
- the dimension of the largest contiguous area of critical two-dimensional elements of the component model,
- preferably number, position, size, and evaluation results of the contiguous areas, and
- evaluation of the component.

The procedure just described is preferably performed for more than one single model. Instead, various design states of the industrial system are compared to one another. Documentation is generated for each design state. In particular, the comparison concerns the number of identified critical areas, the determined average and maximum stresses, and the sizes of the contiguous areas of critical two-dimensional elements in each design state.

The documentation of the model is used in particular as the basis for a modified design. In a work sequence which documents the modified design and involves all those. concerned, the documentation provides the justification for the individual changes to the model.

A modified model is preferably subjected to a finite element simulation and then to the method according to the present invention again. A check is performed to see whether the modified design has resulted in lower stresses, smaller areas of critical two-dimensional elements, and/or better evaluations of the component models. For example, the cycle of modified design, finite element simulation, and the method according to the present invention is repeated until no two-dimensional elements of the model are classified as critical.

It is preferably taken into account that a modified design is usually not meshed using the same finite elements. In each meshing new finite elements are generated, which may differ from the finite elements of a previous meshing regarding their positions or dimensions. Therefore, the center of gravity and the dimensions of a contiguous area of critical two-dimensional elements which is determined by using the method are stored. When using the method again for another mesh, a check is performed to see whether or not a contiguous area of critical two-dimensional elements having the same or a nearby center of gravity and similar dimensions has been obtained. This makes it possible to determine the effect of the modified design.

Test results may be used to evaluate the degree of criticality of critical two-dimensional elements. For example, the following evaluations are made:
- Based on the test results, a step is modified. For example, the factor or the added quantity used in the case the step's premises are met is changed. Or the step is made dependent on the area of the car body in which the determined two-dimensional element is located.
- By using the method according to the present invention, a two-dimensional element is classified as critical. In the test the corresponding actual component withstands the load without the occurrence of a crack or a failure. Then the two-dimensional element is less critical The design is modified. For the two-dimensional element previously classified as critical, an even higher stress is computed in the subsequent finite element simulation, and the two-dimensional element is again classified as critical. While failure is not certain now, but likely, the two-dimensional element is evaluated as rather critical.

At least one further two-dimensional element is classified as critical by using the method according to the present invention. A test finds cracks or even failure. The design is modified. When the method is used again, the further two-dimensional element is classified as critical again. It is then very likely that the corresponding component will fail even after the modification, and the two-dimensional element is evaluated as highly critical.

For example, the finite element tool FEMSITE or another software tool for service life analysis automatically determines the static equivalent load cases and, using superposition, quantitatively determines the damage suffered by the components due to the set of loads, i.e., the accumulation of individual load cases over time. The superposition is determined by calculating a weighted sum of individual loads. This load results in actual damage, which according to the "miner's rule," (see, for example, http://engineerstoolbox.com/doc/etb/mod/fm1/miner/miner_help.html) is compared to the damage the industrial system is capable of withstanding as a maximum.

The method according to the present invention may be modified in such a way that, instead of computing the stresses in the finite elements, the damage caused is computed using FEMSITE, for example, an element limiting value is established for each determined two-dimensional element, and the two-dimensional element is classified as critical if damage greater than the element limiting value occurs. The material properties are contained in the computation of the damage and therefore do not affect the criteria.

A program which carries out the method according to the present invention is preferably executed using an electronic library. This library includes pre-manufactured in a computer-evaluatable formal language. This library is designed in such a way that it is easily expandable and modifiable. In this way the criteria, for example, the stress limiting value or factors and added quantities are rapidly modifiable. The library having the language constructs is separated from the criteria in the software, so that the program library is modifiable and portable to another operating system, for example, without disclosing the criteria.

The program is preferably implemented as a rule-based system. Such systems are sometimes referred to as "expert systems" and are known from the following publications, for example:

T. Breitfeld: "Entwicklung von Expertensystemen zur Unterstüitzung konstruktionsbegleitender Finite-Elemente-Berechnungen" [Development of Expert Systems for Assisting Design-Accompanying Finite Element Computations] in B. Kröplin (Ed.): Report 29-99, Institut f. Statik und Dynamik der Luft-und Raumfahrtkonstruktionen, Stuttgart University (1999), F. Puppe & J. Meyer-Fijara: "Expertensysteme und Wissensmodellierung" [Expert Systems and Knowledge Modeling], in G. Görtz (Ed.): "Einführung in die künstliche Intelligenz" [Introduction to Artificial Intelligence], Addison-Wesley Publ., 2nd Ed. (1995), Chapter 7, pp. 705-753

G. Riley & J. Giarratano: "Expert Systems: Principles and Programming," PWS Publ., $2^{nd}$ Ed. (1993).

In a rule-based system, IF-THEN rules each having a premise and a conclusion are stored. Each rule implements a step. The premise represents the criterion of the particular step and is met if the criterion is met. For example, if the premise is a computer-evaluatable expression of the query "Is the two-dimensional element adjacent to a triangle?" the conclusion is the step itself, i.e., an increase in the element limiting value by 10%.

The design as a rule-based system makes it superfluous for the programmer to establish the sequence in which the steps are executed. Instead, he "fills" the rule database of the expert system with the IF-THEN rules. A problem solution component evaluates these rules automatically and establishes the element limiting value of each two-dimensional element.

What is claimed is:

1. A finite element simulation method for an industrial system using a data processing system, the method comprising:

providing a computer-evaluatable design model of the system, the model defining a plurality of finite elements;

computing a respective stress occurring in each of the finite elements according to a finite element analysis;

identifying each two-dimensional finite element having a stress that exceeds a predefined stress limiting value as an identified finite element;

determining an element limiting value for each of the identified finite elements having at least four sides and four grid points;

classifying each of identified finite elements as critical if the respective stress of the identified finite element is greater than the element limiting value for the identified finite element, wherein the determining of the element limiting value includes the following steps:

assigning a predefined stress limiting value as a starting value for the element limiting value;

increasing the element limiting value if a side or a grid point of the identified finite element is adjacent to one of a triangle and a rigid object element;

increasing the element limiting value if a grid point of the identified finite element is located at a rounded corner of the model; and increasing the element limiting value if no side of the identified finite element is located at an edge delimiting the model and if no side of the identified finite element is adjacent to a side of another identified finite element; and generating a graphic representation of the model.

2. The method as recited in claim 1, wherein the increasing of the element limiting value if a grid point of the identified finite element is located at a rounded corner of the model includes one of multiplying by a factor and adding a quantity, wherein the factor or the added quantity is a function of at least one of the following parameters:

a surface area of the identified finite element;

an angle between the two edges of the model which delimit the rounded corner; and a number of additional identified finite elements having a side adjacent to the identified finite elements and having no grid point at the corner.

3. The method as recited in claim 1, wherein the increasing of the element limiting value if a side or a grid point of the identified finite element is adjacent to one of a triangle and a rigid object element is includes one of multiplying by a factor and adding a quantity, wherein the factor or the added quantity is a function of at least one of the following parameters:

a surface area of the identified finite element;

a surface area of the adjacent triangle or rigid object element; and a number of additional identified finite elements having a side adjacent to the identified finite element and having no side adjacent to a triangle or rigid object element.

4. The method as recited in claim 1, wherein the determining of the element limiting value further includes increasing the element limiting value if one side of the identified finite element is located at a bent edge of the model.

5. The method as recited in claim 1, wherein the determining of the element limiting value further includes determining a geometric quality of the identified finite element and increasing the element limiting value if the geometric quality is less than a predefined quality limiting value, wherein the geometric quality includes at least one of the following:

a quotient of a longest to a shortest side of the identified finite element;

a torsion of the identified finite element;

a distortion of the identified finite element;

a skew of the identified finite element;

a taper of the identified finite element; and a curvature of the identified finite element.

6. The method as recited in claim 1, further comprising subdividing the model into a plurality of partial models, wherein the determining of the element limiting value for each of the identified finite elements includes identifying the respective partial model to which the identified finite element belongs and wherein the increasing of the element limiting value includes one of multiplying by a factor and adding a quantity, wherein the factor or added quantity is a function of the respective partial model.

7. The method as recited in claim 1, wherein the determining of the element limiting value further includes reducing the element limiting value if at least one side of the identified finite element is located at an edge delimiting the model.

8. The method as recited in claim 1, wherein the classifying of the identified finite element as critical includes assigning a degree of criticality to the identified finite element, wherein the degree of criticality is determined by computing a quotient of the respective stress of the identified finite element to the element limiting value of the identified finite element.

9. The method as recited in claim 1, further comprising identifying contiguous areas of the model defined by adjoining ones of the critical identified finite elements, and highlighting the contiguous areas in the graphic representation.

10. The method as recited in claim 1, further comprising identifying contiguous areas of the model defined by adjoining ones of the critical identified finite elements, and determining, for each contiguous area, at least one of the following parameters:

a surface area of the contiguous area;

a center of gravity of the contiguous area;

a number of critical identified finite elements in the contiguous area;

a maximum value of the respective stresses of the critical identified finite elements in the contiguous area;

an average value of the respective stresses of the critical identified finite elements in the contiguous area;

a maximum value of quotients of the respective stresses to the respective element limiting values of each of the critical identified finite elements in the contiguous area;

an average value of quotients of the respective stresses to the respective element limiting values of each of the critical identified finite elements in the contiguous area; and a number of triangles and rigid object elements adjoining at least one of the critical identified finite elements in the contiguous area.

11. The method as recited in claim 10, further comprising providing an additional electronic design model of the industrial system including additional finite elements for the additional model, performing the method as recited in claim 10 for the additional model, and comparing the model and the additional model, wherein the comparing includes at least one of comparing a number of contiguous critical areas in each of the model and the additional model and comparing a computed parameter for the contiguous areas in each of the model and the additional model.

12. The method as recited in claim 1, further comprising:

predefining a load case for the finite element simulation;

computing a damage occurring in the finite elements caused by the load case using the finite element analysis;

identifying each two-dimensional finite element having a respective stress that exceeds a predefined stress limiting value as an identified finite element; and classifying each identified finite element as critical if the damage occurring in the identified finite element is greater than the respective element limiting value of the identified finite element.

* * * * *